Dec. 1, 1931.  F. S. FURMAN  1,834,022
MANURE SPREADER
Filed June 22, 1929   2 Sheets-Sheet 1
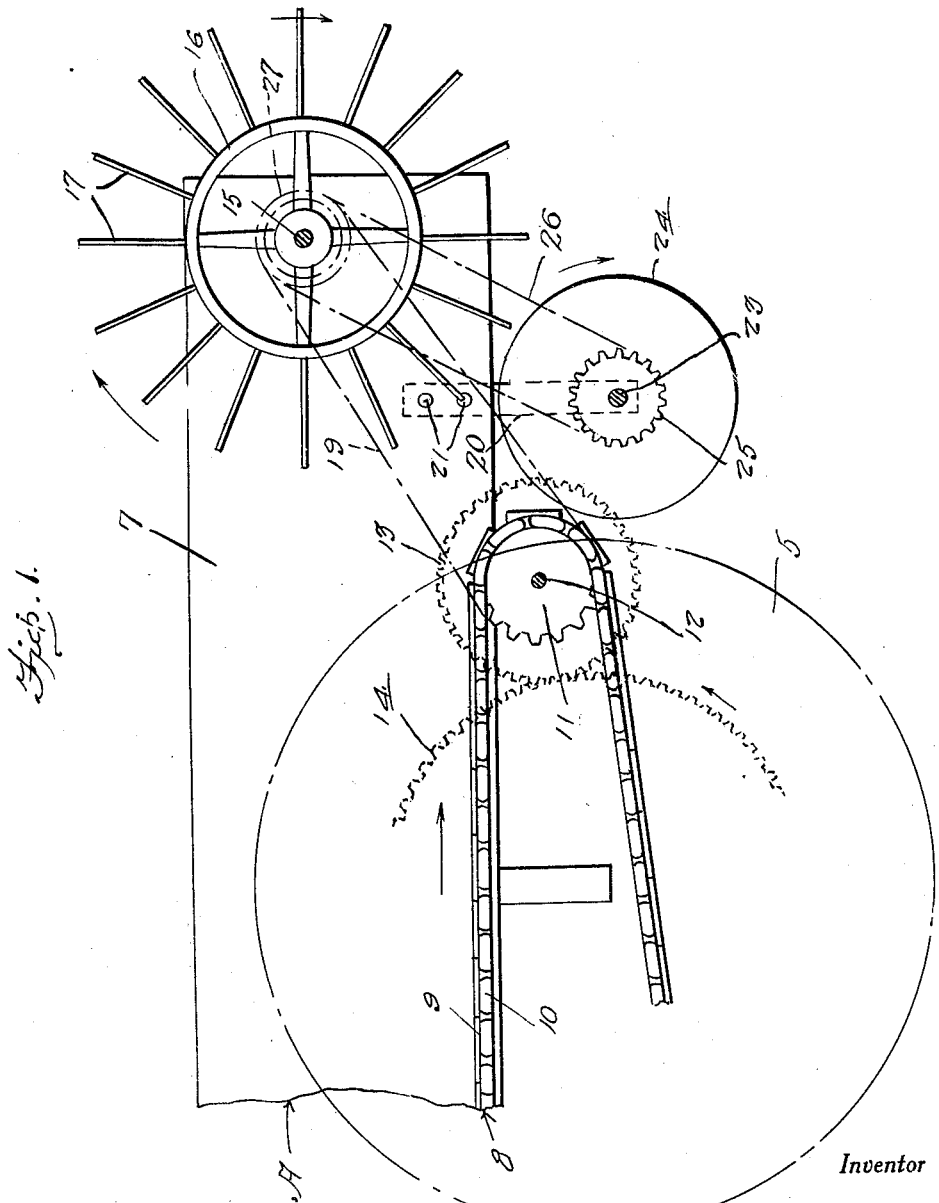
Inventor
*Florus S. Furman*
By *Clarence A. O'Brien*
Attorney

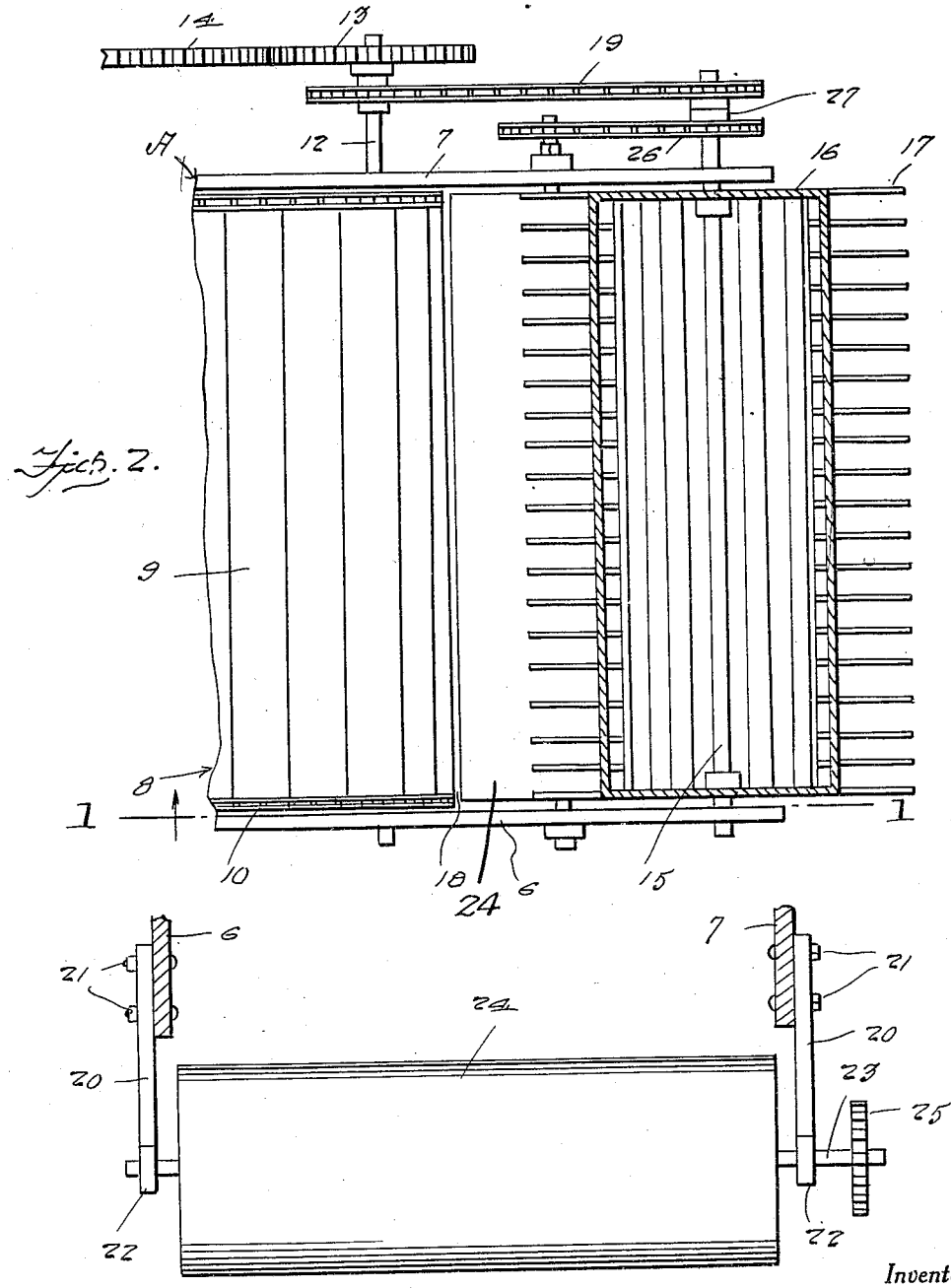

Patented Dec. 1, 1931

1,834,022

UNITED STATES PATENT OFFICE

FLORUS S. FURMAN, OF ROXBURY, NEW YORK

MANURE SPREADER

Application filed June 22, 1929. Serial No. 372,929.

This invention relates to manure spreaders and has for its primary object the provision of a supplemental or additional feed for the cylinder or feeder on the manure spreader.

A very important object of this invention is, therefore, to provide means adapted to be rotatably supported on the vehicle upon which the manure spreading devices are supported, and to be disposed thereon intermediate the movable floor of the spreader and the manure beater for receiving and conveying manure from the movable floor to the beater to be properly spread upon the ground by the beater.

Another very important object of the invention is therefore, the provision of an additional or supplemental feed means for feeding the manure from the movable floor to the manure beater, thus insuring the proper spreading of the manure and otherwise greatly enhancing known devices of this type.

Another very important object of this invention is to provide a supplemental or additional feed to the beater or manure spreader which will be very simple in construction, strong, durable, practical, reliable, positive in operation, and otherwise thoroughly adapted for the purpose for which it is designed.

Other objects and advantages of the invention will become apparent during a study of the following description taken in connection with the accompanying drawings, wherein:

Figure 1 is a fragmentary longitudinal sectional elevational view taken substantially on line 1—1 of Figure 2.

Figure 2 is a top plan view of the device, as illustrated in Figure 1, the beater being shown in horizontal longitudinal section.

Figure 3 is a front elevation of my improved supplemental feed device.

With reference more in detail to the drawings, it will be seen that A represents generally a manure spreader of known or conventional form. Accordingly, as illustrated, the manure spreader comprises a wagon box mounted on suitable wheels 5, said box comprising the spaced parallel side walls 6 and 7, respectively. As is well known in the art, manure spreaders are provided with an endless floor or bottom 8, the same extending longitudinally of the wagon, and operable between the said side walls 6 and 7 of the box.

As herein illustrated, the movable floor 8 is, of course, of endless construction and comprises transversely extending spaced parallel slats 9. The slats 9 at their opposite ends are secured to endless chains 10. The chains 10 are trained over sprocket gears 11 carried on opposite ends of a shaft 12. The shaft 12 is suitably journaled transversely of the wagon box and one end of said shaft projects laterally beyond the side wall 7 of the wagon box. At the extremity of said projecting end, the shaft 12 is provided with a gear 13, in mesh with a relatively larger gear 14, said gear 14 being suitably fixed to the wheel 5, whereby rotation may be imparted to the shaft 12, through the medium of the said gear for operating the endless wagon floor 8, as the wagon is drawn over the ground. A transversely extending horizontally disposed shaft 15 has its opposite ends suitably journaled in the rear end portions of the respective walls 6 and 7 of the wagon box, one end of said shaft 15 also projecting laterally from the side 7 of the wagon box.

Fixed to and adapted for rotation with this shaft 15 is the elongated cylindrical beater drum 16, as shown. The drum 16 may be of any suitable construction and has projecting therefrom radially extending circumferentially spaced beater arms 17. As is obvious, this drum 16 is in spaced relation to the inner end of the floor 8, and is supported on the shaft 15, above the plane of this floor. Thus it will be seen that a space 18, extends for the full width of the wagon box between said inner end of the floor 8 and the beater drum 16.

The shaft 15 is operatively associated with and is adapted to receive rotary motion from the shaft 12, through the medium of suitable chain and sprocket connections 19.

Strap irons 20—20 are each secured at their upper ends, as at 21—21 to the outer faces of the respective side walls 6 and 7, of the wagon drum, and to that portion of the respective side walls which is disposed within the area of the openings 18. It is to be further noted that these strap irons 20—20 fixed to said walls 6 and 7 respectively as just described, are preferably affixed thereto, adjacent the outer periphery of the drum 16 (see Figure 2). At their lower ends or free extremities, each of the strap irons 20—20 terminates in bearings 22—22. A transversely extending horizontally disposed shaft 23 has the opposite ends thereof journaled in the bearings 22—22 as shown to advantage in Figure 3.

Secured to said shaft 23 is an elongated cylindrical drum 24, disposed thereon between the straps 20—20 and is adapted to rotate with the shaft 23. Thus it will be appreciated that this drum 24 is interposed between the inner ends of the movable floor 8, and the beater 16 and is located within the space 18 for rotatable movement therein in operative association both to the floor 8 and the beater 16. At one end thereof, the shaft 23 likewise extends laterally beyond the wall 7, and as said extended end is provided with a sprocket 25.

A suitable endless drive chain 26 is trained over the sprocket 25 and also over a sprocket 27 fixed to the shaft 15.

From the foregoing then, it will be obvious that rotary motion being imparted to the shaft 12 for operating the floor 8, said motion being imparted to the shaft 12 through the medium of the intermeshing gears 13 and 14, further rotary motion in a direction as indicated by the arrow in Figure 1 will be imparted to the beater 16, through the medium of the chain and sprocket connection 19, between the shafts 12 and 15. Likewise then, is it apparent that rotary motion to the drum 24 will also be imparted thereto in a direction indicated by the arrow in Figure 1, from the shaft 15, through the medium of the chain 26, trained over the sprockets 25 and 27 respectively, as shown.

From the foregoing then, it will be seen that the manure conveyed upon the endless floor 8, instead of being transferred directly to the beater 16 as was the customary procedure in spreaders of this type, which resulted in a great deal of the manure dropping to the ground before being conveyed or received by the beater to be properly fed, the manure will, according to the present invention, be received upon the rotatable cylinder 24 and from thence received by the beater 16 to be properly treated and spread upon the ground as the manure spreader travels thereover.

Thus it will be readily appreciated that I have provided a very simple and practical means to be utilized as a supplemental feed, for the beater of a manure spreader, which will be positive in operation, can be readily interposed between the beater and the adjacent end of the manure spreader floor, and the additional feed being simultaneously operated with the floor and the beater.

Even though I have herein shown and described the preferred embodiment of my invention, it is to be understood that the same is susceptible to changes fully comprehended by the spirit of the invention and the scope of the appended claims.

What is claimed is:

1. In a manure spreader of the class described wherein the manure spreader comprises a pair of spaced parallel side members, and an endless floor movable between said side members, of a beater member rotatably supported upon said side members and arranged in a plane above the floor, said beater member being disposed in operative spaced relation with respect to one end of the floor, of an elongated cylinder member rotatably disposed in the space between said floor and said beater member, means for rotatably mounting said cylinder member, rearwardly and beneath said beater member, and means for simultaneously operating said floor, beater member and said cylinder.

2. In combination with a manure spreader, wherein the manure spreader comprises a pair of spaced parallel side members, an endless floor movable between said side members, means for operating the floor, a beater member rotatably supported between said side members and arranged in a plane above said floor, said beater member being disposed in spaced relation with respect to the rear end of said floor, a pair of strap members depending from said side members respectively, said strap members depending from said side members at a point intermediate said beater members and said floor, a shaft rotatably supported in the lower ends of said strap members, means operatively associating said shafts with said beater member, and an elongated cylindrical member carried by and rotatable with said shaft.

In testimony whereof I affix my signature.

FLORUS S. FURMAN.